United States Patent [19]
Kahle et al.

[11] Patent Number: 5,148,547
[45] Date of Patent: Sep. 15, 1992

[54] METHOD AND APPARATUS FOR INTERFACING BIT-SERIAL PARALLEL PROCESSORS TO A COPROCESSOR

[75] Inventors: Brewster A. Kahle, Somerville; David C. Douglas, Boston; Alexander Vasilevsky, Watertown, all of Mass.; David P. Christman, Newport, Vt.; Shaw W. Yang, Waltham; Kenneth W. Crouch, Cambridge, both of Mass.

[73] Assignee: Thinking Machines Corporation, Cambridge, Mass.

[21] Appl. No.: 704,688

[22] Filed: May 17, 1991

Related U.S. Application Data

[63] Continuation of Ser. No. 179,020, Apr. 8, 1988, abandoned.

[51] Int. Cl.[5] .............................................. G06F 15/16
[52] U.S. Cl. .................................. 395/800; 364/229.2; 364/232; 364/231.9
[58] Field of Search ........................................... 395/800

[56] References Cited

U.S. PATENT DOCUMENTS

| | | | |
|---|---|---|---|
| 3,800,289 | 3/1974 | Batcher | 364/200 |
| 4,416,177 | 11/1983 | Loeb | 84/620 |
| 4,600,988 | 7/1986 | Tendulkar et al. | 364/200 |
| 4,728,930 | 3/1988 | Grote et al. | 341/101 |
| 4,736,333 | 4/1988 | Mead et al. | 364/736 |
| 4,811,210 | 3/1989 | McAulay | 364/200 |
| 4,811,214 | 3/1989 | Nosenchuck | 364/200 |

Primary Examiner—Lawrence E. Anderson
Attorney, Agent, or Firm—Francis E. Morris; Richard A. Jordan

[57] ABSTRACT

A parallel processor is disclosed which combines the advantages of an array of bit-serial processors and an array of word-oriented processors. Further, the invention provides for ready communication between data organized in bit-serial fashion and that organized in parallel. The processor comprises a plurality of word-oriented processors, at least one transposer associated with each processor, said transposer having n bit-serial inputs and m bit parallel outputs and a bit-serial processor associated with each bit-serial input of the transposer. The parallel processor further comprises a memory for each bit-serial processor and a data bus interconnecting the memory, the bit-serial processors and the bit-serial inputs of the transposer. The transposer converts serial inputs to parallel, word organized outputs which are provided as inputs to the word-oriented processors. In accordance with a preferred embodiment of the invention, three or more transposers are used in connection with each word-oriented processor so as to provide a pipelining capability that significantly enhances processing speeds.

14 Claims, 3 Drawing Sheets

METHOD AND APPARATUS FOR INTERFACING BIT-SERIAL PARALLEL PROCESSORS TO A COPROCESSOR

This is a continuation of application Ser. No. 07/179,020, filed Apr. 8, 1988, now abandoned.

CROSS REFERENCE TO RELATED PATENTS AND PATENT APPLICATIONS

Related applications are "Parallel Processor", Ser. No. 499,474 filed May 31, 1983, now U.S. Pat. No. 4,814,973, "Method and Apparatus for Interconnecting Processors in a Hyper-Dimensional Array", Ser. No. 740,943, filed May 31, 1985, now U.S. Pat. No. 4,805,091, "Method of Simulating Additional Processing in a SIMD Parallel Processor Array", Ser. No. 832,913, filed Feb. 24, 1986, now U.S. Pat. No. 4,773,038, , "Very Large Scale Computer", Ser. No. 902,290, filed Aug. 29, 1986, "Massively Parallel Processor", Ser. No. 924,090, filed Oct. 28, 1986, now abandoned, "Error Control Method and Apparatus", Ser. No. 939,599, filed Dec. 10, 1986, now U.S. Pat. No. 4,805,173, and "Method and Apparatus for Routing Message Packets", Ser. No. 043,126, filed Apr. 27, 1987, now U.S. Pat. No. 4,984,235, all of which are incorporated herein by reference. Related patents are U.S Pat. No. 3,800,289 for "Multi-Dimensional Access Solid State Memory", U.S. Pat. No. 4,709,327 for "Parallel Processor/Memory Circuit" and U.S. Pat. No. 4,598,400 for "Method and Apparatus for Routing Message Packets" both of which are incorporated herein by reference.

BACKGROUND OF THE INVENTION

This relates to a method and apparatus for providing both bit-serial and word-oriented processing in a parallel computer.

Parallel computers fall into two main groups, control parallel computers and data parallel computers, each with different processor and word width requirements.

Control parallel computers achieve increased performance by taking advantage of parallelism found in the control structure of programs. The Illiac IV, Cray X-MP, BBN Butterfly and CalTech Cosmic Cube are examples of control parallel computers. In a control parallel computer, each processor executes a portion of the overall program. Consequently, each processor must have capabilities comparable to the processor of a serial computer on which the same program could be run. This means that the factors which affect processor design for a control parallel computer are very similar to those of a serial machine.

In particular, control parallel computers typically use word-oriented processors in which each processor receives as an input a plurality of bits in parallel. This unit of input is often referred to as a word and the number of bits as the word width or word length. The number of bits varies widely. In microprocessors it has ranged from four bits in the earliest microprocessors such as the Intel 4004 to thirty-two bits in the most advanced microprocessors available today. In larger processors, even larger word widths have been the norm. For example, the Illiac IV used a word width of 64 bits.

Word-oriented processors tend to be special purpose. They are generally optimized for a fixed set of instructions/operations and data types or storage formats and handle those cases very efficiently. If other storage formats or data types are desired, however, large penalties in either performance or storage efficiency result. Depending on their use, word-oriented processors may be general purpose enough to emulate the functions which are not part of their instruction set, or they may be so special purpose as to be only useful for the small set of instructions for which they were designed. For example, a Motorola 68020 processor is capable of emulating floating point instructions, while many commercial floating point chips are incapable of efficiently performing a logical OR operation. Directly performing special functions rather than emulating them with a series of logical operations makes such word-oriented ALUs, in general, less flexible.

Data parallel computers achieve increased performance by taking advantage of parallelism found in the data of a problem. The Solomon computers, the Array Processor, the STARAN, the Massively Parallel Processor, and the Connection Machine System are examples of data parallel computers. Data parallel computers consist of a single instruction engine with hundreds or thousands of data processors. Each data processor has a local memory and is connected to a communications network over which it may exchange information with other processors. The factors which affect the design of data processors in a data parallel computer are quite different from the processors of a control parallel computer for two reasons. First, the control aspects of a program on the data parallel computer may be executed by the instruction engine. This means that the data processors are not required to handle instructions or addresses, and may instead be tuned for data manipulation. Second, for data parallel problems tens of thousands of data elements may be operated on simultaneously. This implies that any parallelism which is made available can be used effectively.

Data parallel computers typically use a multitude of bit-serial processors each of which receives data one bit at a time and operates on this data to produce an output one bit at a time.

Bit-serial processors are very simple. A three input ALU that operates on single-bit quantities can only produce eight possible outputs. Therefore, an ALU operation such as an Add or a logical OR may be specified by providing the eight-bit truth tables for the particular function. This means that bit-serial processors can be implemented with minimal instruction decoding. There are no carry chains since only one bit from each operand is available on each cycle. This simplicity makes them fast, compact, and easy to implement. Since they implement all possible Boolean operations efficiently, bit-serial processors can support a wide variety of operations and data types. Bit-serial processors also use memory very efficiently because any sized word can be stored without wasting any bits.

As shown in FIG. 1A of the above-referenced U.S. Pat. No. 4,598,400, one type of bit-serial parallel computer comprises a mainframe computer 10, a microcontroller 20, and an array 30 of parallel processing integrated circuits 35. Mainframe computer 10 may be a suitably programmed commercially available general purpose computer such as a VAX (TM) computer manufactured by Digital Equipment Corp. Microcontroller 20 is an instruction sequencer of conventional design for generating a sequence of instructions that are applied to array 30 by means of a thirty-two bit parallel bus 22. Microcontroller 20 receives from array 30 a signal on line 26. This signal is a general purpose or GLOBAL signal that can be used for data output and status information. Bus 22 and line 26 are connected in parallel to each IC 35. As a result, signals from microcontroller 20 are applied simultaneously to each IC 35 in array 30 and the signal applied to microcontroller 20 on line 26 is formed by combining the signal outputs from all of ICs 35 of the array.

Array 30 contains thousands of identical ICs 35; and each IC 35 contains several identical processor/memories 36. In the embodiment disclosed in the '400 patent, it is indicated that the array may contain up to 32,768 ($=2^{15}$) identical ICs 35; and each IC 35 may contain 32 ($=2^5$) identical processor/memories 36. At the time of filing of this application for patent, arrays containing up to 4,096 ($=2^{12}$) identical ICs 35 containing 16 ($=2^4$) identical processor/memories each have been manufactured and shipped by the assignee as Connection Machine (Reg. TM) computers.

Each IC 35 contains a plurality of processor/memories that are disclosed in greater detail in FIG. 7A of the U.S. Pat. No. 4,598,400 and in FIGS. 4 and 6 of '090 application for "Massively Parallel Processor". As shown in FIG. 7A, processor/memory 36 comprises a random access memory (RAM) 250, an arithmetic logic unit (ALU) 280 and a flag controller 290. The inputs to RAM 250 include a message packet input line 122 from a communication interface unit (CIU) 180 of FIG. 6B of that patent; and the outputs from RAM 250 are lines 256, 257 to ALU 280. The ALU operates on data from three sources, two registers in the RAM and one flag input, and produces two outputs, a sum output on line 285 that is written into one of the RAM registers and a carry output on line 287 that is made available to certain registers in the flag controller and can be supplied to communications interface unit 180 via message packet output line 123.

An alternative design for the processor/memory is disclosed in the '090 application for "Massively Parallel Processor" As shown in FIGS. 4 and 6 thereof, the processors and memories are located in separate integrated circuits 334, 340 mounted on the same circuit board. In particular, each integrated circuit 334 comprises sixteen identical processors 336, a control unit 337, a router 338 and a memory interface 339. The memory interface connects the sixteen processors of an integrated circuit 334 to their memories which, illustratively, are located on sixteen separate integrated circuits 340. The router 338 connects the sixteen processors to twelve nearest neighbor routers connected in a twelve dimension hypercube.

While a properly programmed bit-serial processor is able to perform many mathematical or logic operations, it has to perform these operations one bit at a time. As a result, it is not able to take advantage of any optimized procedure that might be useful, for example, in multiplying multi-digit numbers. At the same time as noted above, word-oriented processors which can be optimized for performing certain functions are not as flexible as bit-serial processors in performing all types of arithmetic and logic operations.

SUMMARY OF THE INVENTION

We have devised a parallel processor which combines the advantages of an array of bit-serial processors and an array of word-oriented processors. Further, the invention provides for ready communication between data organized in bit-serial fashion and that organized in parallel.

In accordance with a preferred embodiment of the invention, the parallel processor comprises a plurality of word-oriented processors, at least one transposer associated with each processor, said transposer having n bit-serial inputs and m bit parallel outputs and a bit-serial processor associated with each bit-serial input of the transposer. The parallel processor further comprises a memory for each bit-serial processor and a data bus interconnecting the memory, the bit-serial processors and the bit-serial inputs of the transposer.

The transposer converts serial inputs to parallel, word organized outputs which are provided as inputs to the word-oriented processors. In a preferred embodiment m equals n such that the parallel output of the transposer has as many bits as it has serial inputs. An embodiment of the parallel processor has been implemented incorporating 64K bit-serial processors, 2K word-oriented processors and associated transposers. In accordance with a preferred embodiment of the invention, three or more transposers are used in connection with each word-oriented processor so as to provide a pipelining capability that significantly enhances processing speeds.

BRIEF DESCRIPTION OF THE DRAWINGS

These and other objects, features and advantages of the invention will become more readily apparent from the following detailed description of a preferred embodiment of the invention in which.

DETAILED DESCRIPTION OF THE INVENTION

Figure 1:
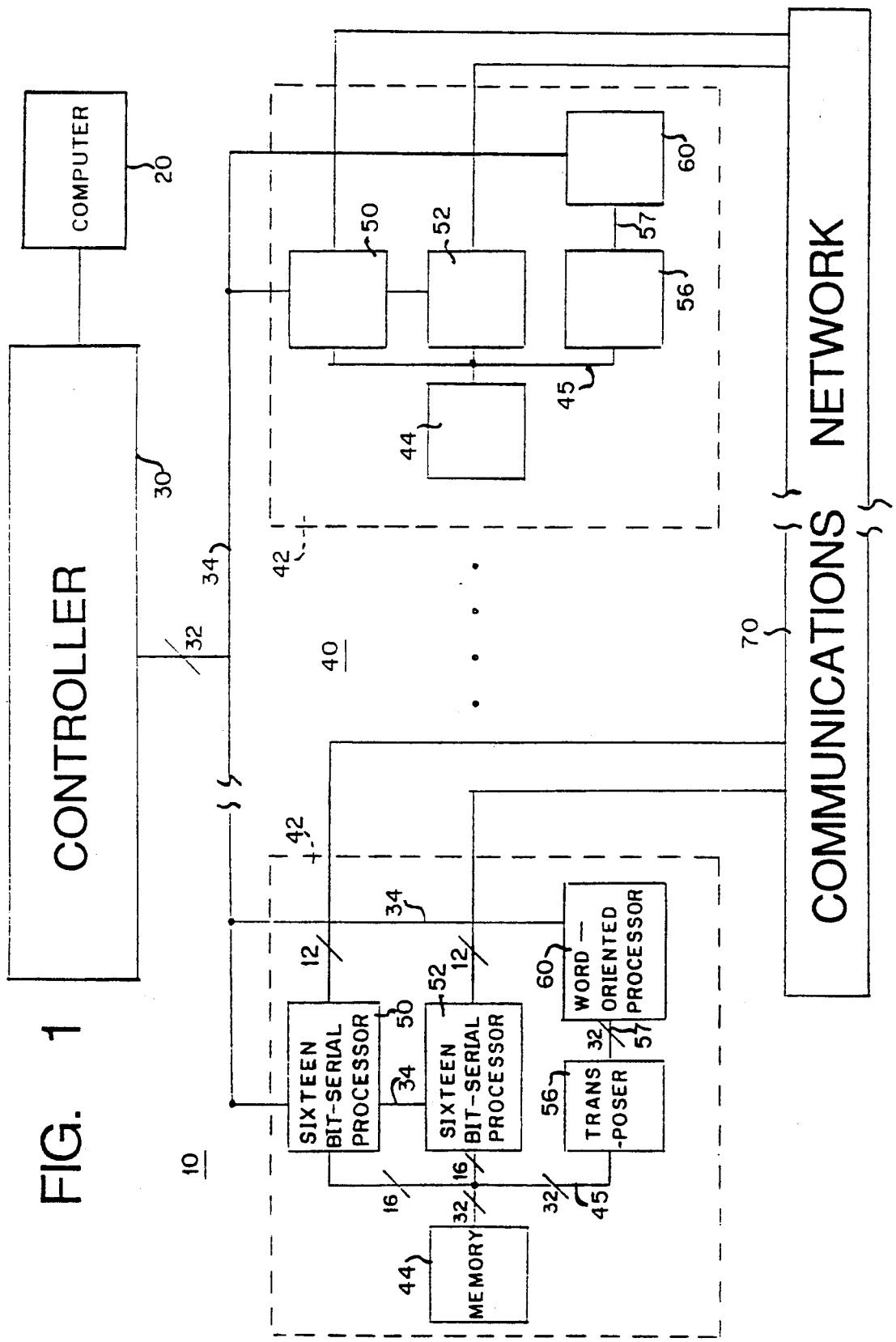
FIG. 1 is a block diagram illustrating a computer system of the present invention.

As shown in FIG. 1 a computer system 10 of the present invention comprises a mainframe computer 20, a controller 30, an array 40 of processing elements and a communication network 70 which interconnects the processing elements. This arrangement of mainframe computer, controller, array of processing elements and communication network is found in other bit-serial parallel processors such as those described in U.S. Pat. 4,598,400. Mainframe computer 20 illustratively is a suitably programmed commercially available, general purpose computer such as a VAX TM computer manufactured by Digital Equipment Corporation. Controller 30 is an instruction sequencer of general design for generating a sequence of instructions that is applied to array 40 by means of a thirty-two bit parallel bus 34. Communication network 70 illustratively is a hypercube interconnection network such as those described in U.S. Pat. No. 4,598,400 and application Ser. No. 043,126.

Array 40 comprises a multitude of processing elements 42 each of which comprises a read/write memory 44, a first set 50 of sixteen bit-serial processors, a second set 52 of sixteen bit-serial processors, a transposer 56 and a word-oriented processor 60. The memory, the bit-serial processors, and the transposer are interconnected by a thirty-two bit wide memory data bus 45 and the transposer and the word-oriented processor are interconnected by a thirty-two bit wide transposer data bus 57.

Advantageously, each set 50, 52 of sixteen bit-serial processors is implemented on a single integrated circuit and each bit-serial processor of a unit has associated with it a 64K×1 bit portion of read/write memory 44. Memory 44 may be implemented in the form of thirty-two separate 64K×1 bit memory chips.

The interrelationship between the sets of sixteen bit-serial processor and memory 44 is described in detail in application Ser. No. 902,290 and need not be discussed further. Advantageously, as described in application Ser. No. 939,599, memory 44 also stores error control and correction (ECC) bits which can be used to detect and correct errors in the data stored in the memory. As this feature plays no part in the present invention, it is not illustrated in FIG. 1, but it will be understood that additional memory and additional data paths are used for handling ECC bits.

Figure 2:
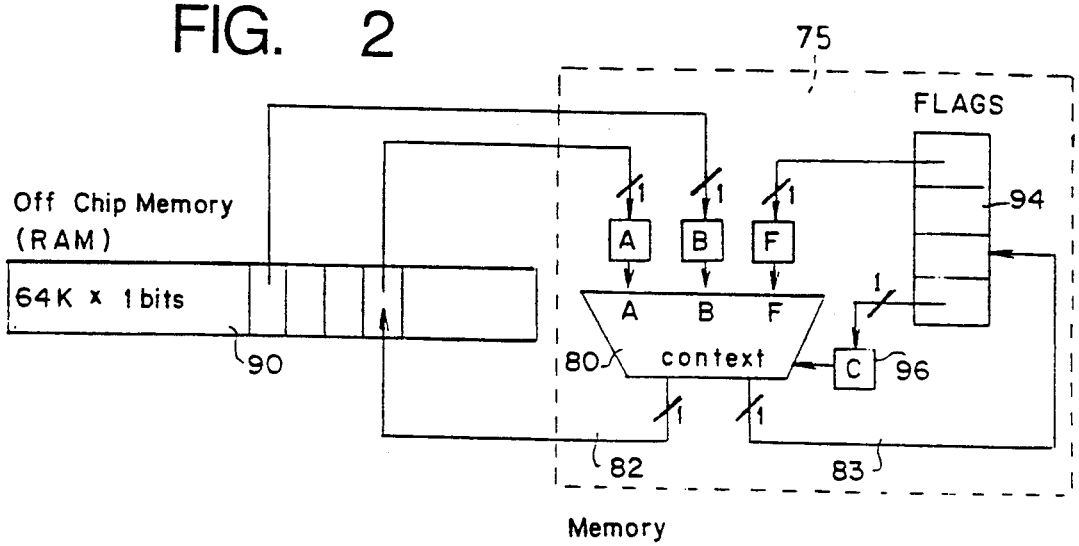
FIG. 2 is a block diagram illustrating a bit-serial processor used in FIG. 1.

As shown in FIG. 2, a single bit-serial processor 75 of any one of sets 50, 52 and associated memory comprises an arithmetic logic unit (ALU) 80, a 64K×1 bit read/write memory 90 and a flag register 94. ALU 80 has three single bit inputs A, B, F and two single bit outputs 82, 83. Inputs A and B are obtained from addressed bit cells in memory element 90 and input F from a flag in flag register 94. Output 82 is provided to one of the addressed bit cells in memory 90 and output 83 is provided to the flag register. Advantageously, ALU 80 is implemented in the form of a series of look-up tables, each of which specifies the output on lines 82 and 83 that is produced by different arithmetic or logical functions in response to the eight possible combinations of input signals on the three inputs A, B, F. Advantageously, as shown in FIG. 2, each bit-serial processor 75 also has a context control 96 which makes it possible to selectively suppress the effect of any particular instruction received at the bit-serial processor from controller 30. This makes it possible for the bit-serial processor to ignore instructions from the controller when conditions at the bit-serial processor make it desirable or even necessary to do so. For example, if a divisor stored in a particular bit-serial processor is a zero, it will be necessary for that individual processor to ignore a divide instruction issued by the controller to all the processors.

Figure 3:
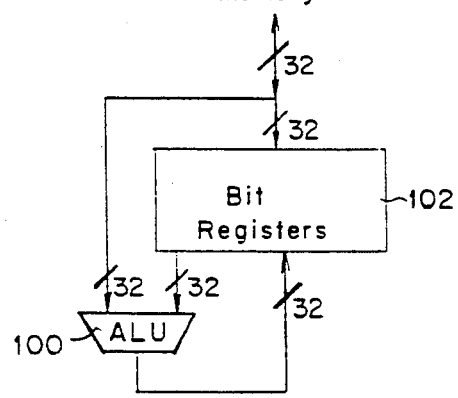
FIG. 3 is a block diagram illustrating a word-oriented processor used in FIG. 1.

As shown in FIG. 3, word-oriented processor 60 comprises an ALU 100 and thirty-two thirty-two-bit registers 102. Advantageously, the word-oriented processor is a commercially available processor. Numerous such processors are available which are suitable for use in the practice of the invention. In particular the Weitek Model 3132 Floating Point Processor has been implemented in the apparatus shown in FIG. 1; and the sixty-four bit word Weitek Model 3164 Floating Point Processor could readily be implemented if sixty-four bit words were desired. In addition to floating point processors, numerous other types of word-oriented processors may also be used in the practice of the invention. For example, depending on the application, integer processors such as those also made by Weitek or signal processors such as those made by Texas Instruments could also be used.

Transposer 56 is a device for converting bit-serial data into word organized data. Transposers are known in the art and are described, for example, in U.S. Pat. No. 3,800,289 to Batcher which is incorporated herein by reference.

Figure 4:
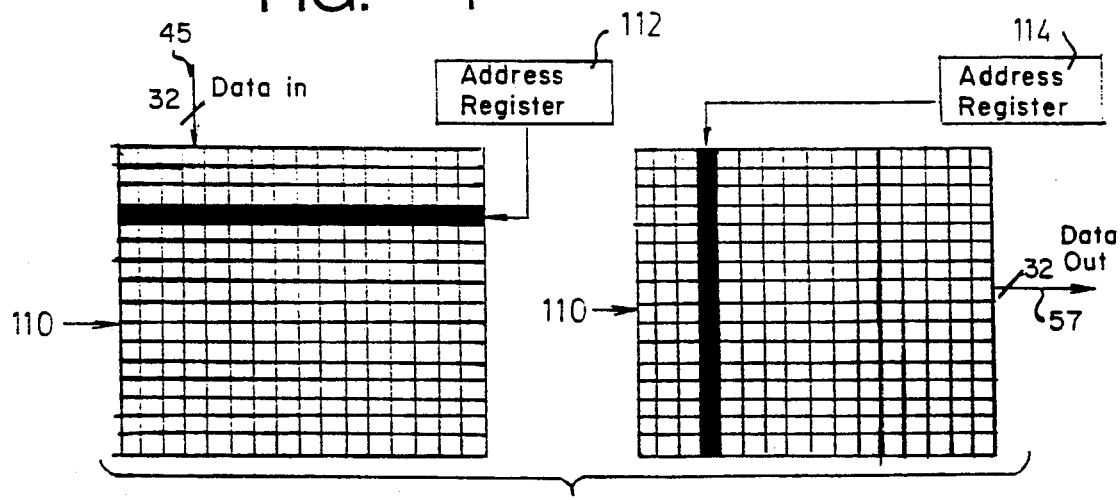
FIG. 4 is an illustration useful in understanding the operation of a transposer used in FIG. 1.

The general operation of transposer 56 is best understood from the simplified schematics of FIG. 4 which depict an array 110 of memory cells arranged in n rows and m columns. Transposing array 110 has n inputs, one for each column of cells and a single m-bit wide parallel output. Data is input into array 110 from n sources by shifting the data from each of n sources serially down one of the columns of cells or by writing it into successive cells of a column under control of an address pointer 112. Data is read out of array 110 in parallel one column at a time, either by shifting it out or by reading it under control of a second address pointer 114. Thus, a transposer converts an array of data organized by rows to an array organized by columns; and similarly, if columns of data are loaded into the transposer one at a time with each bit position in a column serving as one of the n sources, the transposer converts columns of data to an array organized by rows. Transposers, accordingly, have the useful property that the transpose of the transpose of an input is the original input. To exploit this, the number of rows advantageously equals the number of columns, i.e. m equals n, so that the array of cells is square.

Figure 5:
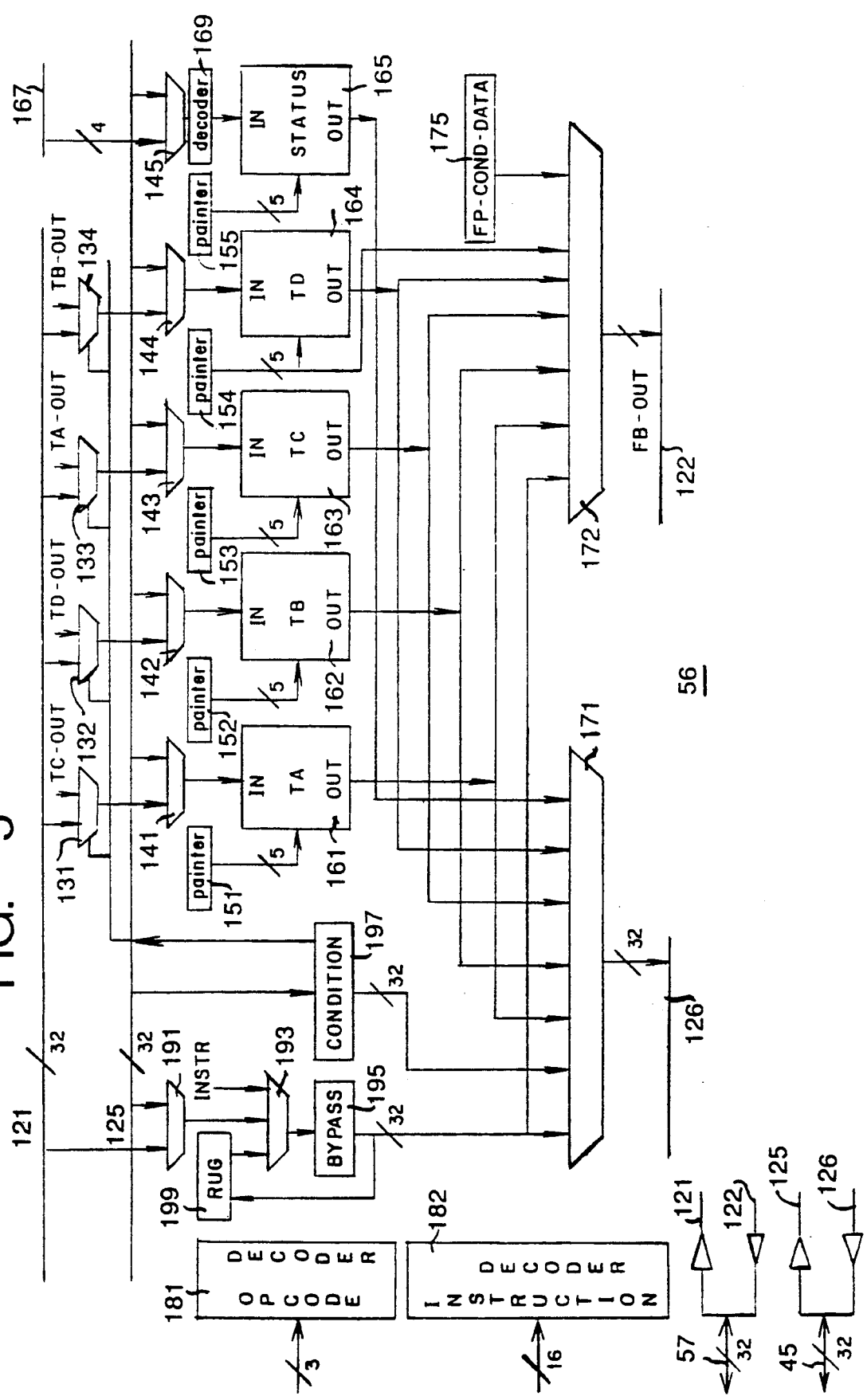
FIG. 5 is a detailed block diagram illustrating the transposer used in FIG. 1.

In the practice of the invention, we have found it advantageous to use a transposer having several such transposing arrays 110 to access each such word-oriented processor as shown in FIG. 5. As depicted therein, a preferred embodiment of the transposer of the present invention comprises first and second internal transposer databuses 121, 122 and first and second internal memories data buses 125, 126, a first plurality of two-to-one multiplexers 131–134, a second plurality of two-to-one multiplexers 141–145, a plurality of address pointers 151–155, a plurality of transposing arrays 161–165 and seven-to-one output multiplexers 171, 172. The transposer also comprises register 175, opcode decoder 181, instruction decoder 182, first and second bypass multiplexers 191 and 193, bypass register 195, condition register 197 and status register 199.

Internal transposer databuses 121, 122 are connected by drivers 123, 124 to transposer databus 57 and internal memory buses 125, 126 are connected by drivers 127, 128 to memory databus 45. Data is supplied to the transposing arrays in bit-serial format on bus 125 from bus 45 or in word-parallel format on bus 121 from word-oriented processor 60. Data from the transposing arrays is applied to word-oriented processor 60 via bus 122 and to memory 44 or bit-serial processors 75 via bus 126.

Multiplexers 131–134 are two-to-one multiplexers each having one input from the first transposer databus 121 and one input from one of the outputs TA-OUT, TB-OUT, TC-OUT and TD-OUT of the transposing arrays 161–164. The outputs of multiplexers 131–134 are supplied as one of the inputs to two-to-one multiplexers 141–144. The other input to each of these multiplexers comes from internal memory bus 125. The output of these multiplexers is provided to one of the transposing arrays 161–164.

The transposing arrays 161–164 are 32×32 arrays which operate as disclosed in connection with FIG. 4 to convert bit-serial inputs to parallel word-oriented outputs under the control of address pointers 151–155. The output of the transposing arrays is applied in parallel to multiplexers 171, 172. Multiplexers 171, 172 are seven-to-one multiplexers, each of which selects one input and provides it to internal memory databus 126 in the case of multiplexer 181 and to internal transposer databus 122 in the case of multiplexer 182. Signals on data bus 126 are then provided to memory 44 or units 52, 56 of bit serial processors. Signals on transposer databus 122 are provided via bus 57 to word-oriented processor 60.

Transposing array 165 is a 13×32 array that is used for storing the status of floating point operations on the word-oriented processor. It is written from internal memory bus 125 or from a status bus 167 from the word-oriented processor under control of multiplexer 145. Since the status information is in coded form, a decoder 169 is used to decode the information supplied to this transposing array.

Decoders 181 and 182 are used to decode opcodes and instructions for the transposer. Signals from these decoders are provided by control lines (not shown) to the various elements of the transposer.

Bypass register 195 is 32 bits wide and one word deep. As its name suggests, it may be used to bypass the transposing arrays. It can also be used to store status information in register 199 which can later be read out through multiplexer 193. Multiplexer 193 also permits instructions to be written into register 195 from the instruction decoder 182.

Condition register 197 is a thirty-two bit wide register that is used to control multiplexers 131-134 and conditionalize various operations. Register 175 supplies floating point conditional data from the word-oriented processor.

In accordance with the invention, the use of a plurality of processing arrays makes it possible to pipeline the conversion of data from bit serial to word-oriented format for use by the word-oriented processor and to convert word-oriented data back to bit serial format for storage in memory 44 or for further processing in bit serial processors 50, 52.

To describe the flow of data through the transposer, a compact notation will be used. A capital letter A, B, or C represents 64K 32-bit single-precision floating point numbers, one for each data processor 75 in all the units 50, 52. When stored in a memory 44, each number is stored in bit-serial format, and when in the word-oriented processor 60 it is in word-oriented format. The symbols "T0", "T1" and "T2" represent three transposing arrays in the transposer. The symbol "M" represents memory. The symbol "RegFile" represents the thirty-two registers 102 of the word-oriented processor. The notation "X(A)" represents X (either memory, a transposing array or the register file) holding the value of A for thirty-two processors. Finally, the notation X(A)—Y represents operand A moving from X to Y.

The operation of the transposer is represented in four columns of the following Tables 1, 2 and 3. Each horizontal line in each table represents a group of repeated operations. The first column (Cycles) shows how many operations are performed. The second and third columns show what happens on the memory and transposer buses 45, 57 of the transposer. The final column shows what happens at the word-oriented processor 60.

The example in Table 1 introduces this notation for the case of a simple floating point multiply of A and B, resulting in C where values of A and B are initially stored in memories 44 for all 64K processors 75 in bit-serial format and the results C in bit-serial format are returned to these memories. The operation is done using only one transposing array. A line-by-line explanation of the table follows immediately after it.

TABLE 1

| | | M(A) * M(B) — M(C) | | |
|---|---|---|---|---|
| Line | Cycles | Memory Bus | Transposer Bus | Processor 60 |
| 1 | 32 | M(A) — T0 | | |
| 2 | 32 | | T0(A) — RegFile | |
| 3 | 32 | M(B) — T0 | | |
| 4 | 32 | | T0(B) — ALU | RegFile(A)* Input(B) — RegFile |
| 5 | 32 | | RegFile(C) — T0 | |
| 6 | 32 | T0(C) — M | | |

Line 1: Operand A in bit-serial format is loaded from memory 44 into transposing array T0.
Line 2: The transposed form of operand A is written from transposing array T0 to the register file 102 of the floating point processor.
Line 3: Operand B in bit-serial format is loaded from memory 44 into transposing array T0.
Line 4: On each cycle, one of the thirty-two instances of transposed operand B is written from transposing array T0 to the ALU 100 of the floating point processor. The other input of the ALU is supplied by the corresponding instance of operand A from the register file 102. The result C is stored back into the register file 102 in the same location as operand A, which is overwritten.
Line 5: The result C in word-oriented format is moved from the register file 102 to transposing array T0.
Line 6: The result C, now transposed to bit-serial format, is written from transposing array T0 into memory 44.

Note that each operation (each line of the table) represents thirty-two cycles. Assuming an operating speed of 6.5 MHz, the above operation requires thirty microseconds to perform a single precision floating point multiply for each processor, or 64K total 32-bit multiplies. This results in a rate of 2,100 single-precision MFlops for this operation.

Table 2 shows how the previous result can be improved if two transposing arrays are used. While the A operand is being moved from transposing array T0 to the register file, the memory bus is available to transfer operand B from memory to another transposing array. Since the transposing arrays cannot be pipelined, a second transposing array is employed to take advantage of this unused bandwidth. With this pipelining, this operation now requires 24 microseconds, resulting in a rate of 2,600 MFlops, or a speedup of 20% over the unpipelined case.

TABLE 2

| | | M(A) * M(B) — M(C) | | |
|---|---|---|---|---|
| Line | Cycles | Memory Bus | Transposer Bus | Processor 60 |
| 1 | 32 | M(A) — T0 | | |
| 2 | 32 | M(B) — T1 | T0(A) — RegFile | |
| 3 | 32 | | T0(B) — ALU | RegFile(A)* Input(B) — RegFile |
| 4 | 32 | | RegFile(C) — T0 | |
| 5 | 32 | | T0(C) — M | |

As described in application Ser. No. 832,913, which is incorporated herein by reference additional processors in a single-instruction, multiple-data, parallel computer can advantageously be simulated by subdividing the memory associated with each physical processor into identical sub-memories and executing in sequence the same instruction or set of instructions on data stored at the same relative locations in each identical sub-memory.

This same technique can also be used with the word-oriented processors of the present invention to further increase the computation rate of the word-oriented processors by maximizing use of the memory bus and the transposer bus. For example, in accordance with application Ser. No. 832,913, each physical processor can be made to simulate four processors by subdividing the memory assigned to each physical processor into four parts and performing the same set of operations on each of these four parts in turn. This operation is illustrated in Table 3 which illustrates the performance of the same mathematical operation as in Tables 1 and 2 but now it is performed on at least four simulated processors.

To track the data, the operands or arguments supplied by the first processor are identified by A0 and B0 and the result of the operation is C0; the operands of the second processor are A1 and B1 and the result is C1; and so forth.

TABLE 3

| | | M(A) * M(B) — M(C) | | |
|---|---|---|---|---|
| Line | Cycles | Memory Bus | Transposer Bus | Processor 60 |
| 1 | 32 | M(A0) — T0 | | |
| 2 | 32 | M(B0) — T1 | T0(A0) — RegFile | |
| 4 | 32 | M(A1) — T0 | T0(B0) — ALU | RegFile(A0)*Input(B0) — RegFile |
| 5 | 32 | M(B0) — T1 | RegFile(C0) — T2 | |
| 6 | 32 | T2(C0) — M | T0(A1) — RegFile | |
| 7 | 32 | M(A2) — T0 | T1(B1) — ALU | RegFile(A1)*Input(B1) — RegFile |
| 8 | 32 | M(B2) — T1 | RegFile(C1) — T2 | |
| 9 | 32 | T2(C1) — M | T0(A2) — RegFile | |
| 10 | 32 | M(A3) — T0 | T1(B2) — ALU | RegFile(A2)*Input(B2) — RegFile |
| 11 | 32 | M(B3) — T1 | RegFile(C2) — T2 | |
| 12 | 32 | T2(C2) — M | T0(A3) — RegFile | |

It can be shown that at an operating speed of 6.5 MHz this arrangement approaches a computation rate of 4,300 single precision Mflops if a large number of processors are simulated.

As will be apparent to those skilled in the art, numerous variations in the invention may be practiced.

What is claimed is:

1. A parallel processor comprising:
   a plurality of word-oriented processors,
   for each word-oriented processor, at least one means having n bit-serial inputs and an m-bit parallel output for performing transpose operations between said inputs and said output, said parallel output being provided to an input to said word-oriented processor,
   for each of the n bit-serial inputs, a bit-serial processor connected thereto, all of said bit-serial processors operating in parallel in a single-instruction-stream, multiple-data-stream environment, and
   for each bit-serial processor, a serial memory connected thereto.

2. The apparatus of claim 1 wherein n equals m.

3. The apparatus of claim 1 wherein there are at least two means for performing transpose operations connected in parallel.

4. The apparatus of claim 1 wherein each means for performing transpose operations comprises an array of memory cells in rows and columns, each of the n inputs being connected to a different column and the m bits of the parallel output being taken from the same column of the array one column at a time.

5. In a parallel processor comprising:
   a plurality of word-oriented processors,
   for each word-oriented processor at least two transposing arrays connected in parallel and having n bit-serial inputs and an m-bit parallel output, said output being provided to an input to said word-oriented processor,
   for each of the n bit-serial inputs, a bit-serial processor connected thereto, all of said bit-serial processors operating in parallel in a single-instruction-stream, multiple-data-stream environment, and
   for each bit-serial processor, a serial memory connected thereto,
   a method of pipelining the conversion of data between bit-serial and word-oriented formats comprising the steps of:
   loading a first of said transposing arrays associated with each word-oriented processor with bit-serial data comprising a first argument of an operation that is to be performed on word-oriented data,
   transferring said first argument from an output of said transposing array to a word-oriented processor where it is stored,
   loading a second of said transposing arrays with bit-serial data comprising a second argument of said operation, and
   performing said operation in said word-oriented processor using at least two arguments, one of which is provided directly from an output of one of said transposing arrays and the other of which has previously been provided from one of said transposing arrays and stored
   wherein at least some of the steps of loading data to a transposing array and transferring data from a transposing array are performed simultaneously.

6. The method of claim 5 wherein n equals m.

7. The method of claim 5 wherein there are at least three transposing arrays connected in parallel.

8. The method of claim 5 wherein each transposing array comprises an array of memory cells in rows and columns, each of the n inputs being connected to a different column and the m bits of the parallel output being taken from the same column of the array one column at a time.

9. The method of claim 5 further comprising the steps of loading a result of said operation into one of said transposing arrays and transferring said result in bit-serial format from an output of said transposing array to said bit-serial processors or said serial memory.

10. The method of claim 5 within the second transposing array is loaded simultaneously with transfer of said first argument to said word-oriented processor.

11. In a parallel processor comprising:
    a plurality of word-oriented processors,
    for each word-oriented processor at least two transposing arrays connected in parallel and having n bit-serial inputs and an m-bit parallel output, said output being provided to an input to said word-oriented processor, for each of the n bit-serial inputs, a bit-serial processor connected thereto, all of said bit-serial processors operating in parallel in a single-instruction-stream, multiple-data-stream environment, and for each bit-serial processor, a serial memory connected thereto, a method of pipelining the conversion of data between bit-serial and word-oriented formats while simulating the presence of additional processors in the array comprising the steps of:

subdividing the memory associated with the bit-serial processors to form a plurality of submemories associated with each bit-serial processor whereby each memory is divided into at least first and second submemories, the first submemories of all the processing elements comprising a first memory group and the second submemories of all the processing elements comprising a second memory group, providing to each memory group in turn a first identical sequence of instructions, loading a first of said transposing arrays associated with each word-oriented processor with bit-serial data from a first submemory comprising a first argument of an operation that is to be performed on word-oriented data, transferring said first argument from an output of said transposing array to a word-oriented processor where it is stored, loading a second of said transposing arrays with bit-serial data from said first submemory comprising a second argument of said operation, performing said operation in said word-oriented processor using at least two arguments, one of which is provided directly from an output of one of said transposing arrays and the other of which has previously been provided from one of said transposing arrays and stored, loading a result of said operation into one of said transposing arrays, transferring said result in bit-serial format from an output of said transposing array to said bit-serial processors or a first submemory of said serial memory, loading a first of said transposing arrays associated with each word-oriented processor with bit-serial data from a second submemory comprising a first argument of an operation that is to be performed on word-oriented data, transferring said first argument from an output of said transposing array to a word-oriented processor where it is stored, loading a second of said transposing arrays with bit-serial data from said second submemory comprising a second argument of said operation, performing said operation in said word-oriented processor using at least two arguments, one of which is provided directly from an output of one of said transposing arrays and the other of which has previously been provided from one of said transposing arrays and stored, loading a result of said operation into one of said transposing arrays, and transferring said result in bit-serial format from an output of said transposing array to said bit-serial processors or to a second submemory of said serial memory, wherein at least some of the steps or loading data to a transposing array and transferring data from a transposing array are performed simultaneously.

12. The method of claim 11 wherein n equals m.

13. The method of claim 11 wherein there are at least three transposing arrays connected in parallel.

14. The method of claim 11 wherein each transposing array comprises an array of memory cells in rows and columns, each of the n inputs being connected to a different column and the m bits of the parallel output being taken from the same column of the array one column at a time.

* * * * *